United States Patent
Heinrich et al.

(10) Patent No.: US 11,799,282 B2
(45) Date of Patent: Oct. 24, 2023

(54) ELECTRICAL SAFETY SYSTEM FOR PROVIDING OVERCURRENT PROTECTION OF AN ELECTRICAL CIRCUIT IN A VEHICLE

(71) Applicant: APTIV TECHNOLOGIES LIMITED, St. Michael (BB)

(72) Inventors: Markus Heinrich, Wiehl (DE); Guillaume Tournabien, Saint Soupplets (FR)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/834,357

(22) Filed: Jun. 7, 2022

(65) Prior Publication Data
US 2022/0376487 A1    Nov. 24, 2022

Related U.S. Application Data

(63) Continuation of application No. 16/997,039, filed on Aug. 19, 2020, now Pat. No. 11,362,506.

(30) Foreign Application Priority Data

Aug. 29, 2019 (EP) .................... 19194381

(51) Int. Cl.
*H02H 3/08* (2006.01)
*H02H 3/087* (2006.01)
*H02H 9/02* (2006.01)
*H02H 1/06* (2006.01)
*G05F 5/00* (2006.01)

(52) U.S. Cl.
CPC ............. *H02H 3/087* (2013.01); *H02H 1/06* (2013.01); *H02H 3/08* (2013.01); *H02H 9/025* (2013.01); *G05F 5/00* (2013.01)

(58) Field of Classification Search
CPC .......... H02H 3/087; H02H 9/025; H02H 3/08; H02H 1/06; H02H 3/00; H02H 9/004; H02H 9/02; G05F 5/00; H03K 1/0822
USPC .......................... 361/2–13, 86–87, 93.7–93.9
See application file for complete search history.

(56) References Cited

U.S. PATENT DOCUMENTS

| 6,710,698 | B1 | 3/2004 | Jehlicka et al. |
| 8,611,063 | B2 | 12/2013 | So |
| 9,917,437 | B2 | 3/2018 | Sun et al. |

(Continued)

OTHER PUBLICATIONS

Extended European Search Report for Application No. EP 19194381.0 dated Apr. 3, 2020.

*Primary Examiner* — Danny Nguyen
(74) *Attorney, Agent, or Firm* — Harness, Dickey & Pierce, P.L.C.

(57) ABSTRACT

An electrical safety system comprises a main safety device including a N-type transistor and an auxiliary safety device including a P-type transistor, alternately activated under command of a controller. The N-type transistor and the P-type transistor have the function of overcurrent protection, respectively in a first operating mode and in a second operating mode. The auxiliary safety device includes a passive component, connected in series with the P-type transistor, for providing a voltage drop when a current passes through the passive component, and a driving circuit for turning off the P-type transistor under control of the voltage drop exceeding a first threshold, in the second operating mode.

16 Claims, 2 Drawing Sheets

(56) References Cited

U.S. PATENT DOCUMENTS

| | | | |
|---|---|---|---|
| 10,498,131 B2 | 12/2019 | Graf | |
| 2007/0103834 A1 | 5/2007 | Huang et al. | |
| 2009/0303647 A1 | 12/2009 | Bauer et al. | |
| 2011/0193414 A1 | 8/2011 | Furuichi et al. | |
| 2012/0250201 A1* | 10/2012 | Johansson | H02H 3/087 |
| | | | 361/63 |
| 2013/0050880 A1* | 2/2013 | Rozman | H01H 33/596 |
| | | | 361/18 |
| 2015/0016005 A1 | 1/2015 | Simonson et al. | |
| 2015/0346758 A1 | 12/2015 | Sakakibara | |
| 2017/0294774 A1 | 10/2017 | Illing et al. | |
| 2018/0048142 A1 | 2/2018 | Immel et al. | |

* cited by examiner

ELECTRICAL SAFETY SYSTEM FOR PROVIDING OVERCURRENT PROTECTION OF AN ELECTRICAL CIRCUIT IN A VEHICLE

CROSS REFERENCE TO RELATED APPLICATION

This application is a continuation of U.S. patent application Ser. No. 16/997,039, filed on Aug. 19, 2020, which claims priority to European Patent Application No. EP 19194381.0, filed on 29 Aug. 2019.

TECHNICAL FIELD

The present disclosure relates to the field of electrical safety systems or devices for providing overcurrent protection of an electrical circuit. Such a system can be used for example in a vehicle to protect the devices of an electrical circuit of the vehicle, in case of malfunction.

BACKGROUND

Conventionally, vehicles use electrical fuses including a metal wire or strip that melts when too much current flows through it, thereby interrupting the current. An advantage of fuses is that they are passive components that do not consume power. The quiescent current through a fuse is zero. Thus, when the electrical circuit of the vehicle is in park mode, the fuses consume no electrical energy. Another advantage is that the fuses have the capacity of removing high power from a faulty system. In other words, a fuse can drain high current and its quiescent current is equal to zero whatever its draining capacity. However, a fuse has a main drawback because it is a sacrificial device. Once a fuse has operated, it must be replaced, which is not convenient in an automotive environment.

It is known to use electronic switching devices, currently called "high-side switches" or "high-side drivers", as an alternative to fuses. A high-side switch includes a transistor (such as a MOSFET transistor) for providing overcurrent protection and electronic means for controlling the transistor. In order to be able to switch high currents (typically currents between 100 mA and several hundreds of amps), high-side switches are provided with a MOSFET transistor of type N. They can safely drive high currents into complex grounded loads, in compliance with the automotive environment. However, high side switches have a high quiescent current, typically a few mA, compared to zero (for a conventional fuse).

Vehicles usually spend a lot of time in park mode, wherein current is drained from the battery. In order not to drain too much energy from the battery, the quiescent current of each device of the electrical circuit within the vehicle has to be very low. A quiescent current of some milliamps is too high with respect to such a constraint of extremely low electrical consumption of the vehicle in park mode.

There is a need to improve the situation with an electrical safety system for providing overcurrent protection of an electrical circuit, for example in a vehicle, that can be reused after it has operated and has also a very low quiescent current, for example in compliance the electrical requirements in the automotive environment.

SUMMARY

A first aspect of the present disclosure concerns an electrical safety system for providing overcurrent protection of an electrical circuit including a main safety device having a first transistor for providing overcurrent protection. An auxiliary safety device includes a second transistor of P-type for providing overcurrent protection of the electrical circuit. The main safety device and the auxiliary safety device provide the overcurrent protection alternately, respectively in a first operating mode and in a second operating mode of the electrical circuit. The auxiliary safety device includes a passive component, connected in series with the second transistor of P-type, for providing a voltage drop when a current passes through the passive component, and a driving circuit controlling turning off of the second transistor of P-type under control of the voltage drop exceeding a first threshold.

Typically, the first operating mode consumes more electrical power than the second operating mode. Such an electrical safety system may be integrated in a vehicle to protect an electrical circuit of the vehicle.

The present electrical safety system comprises a main safety device including a first transistor, for example a N-type transistor, and an auxiliary safety device including a P-type transistor. The two transistors are alternately turned on to achieve in turn the function of overcurrent protection, respectively in a first operating mode and in a second operating mode of the electrical circuit. The auxiliary safety device comprises a passive component, connected in series with the P-type transistor, for providing a voltage drop when a current passes through said passive component, and a driving circuit controlling turning off of the P-type transistor under control of the voltage drop exceeding the first threshold, in the second operating mode.

Such a system allows to use a main safety device using a power transistor (such as a N-type transistor) and capable of removing high currents from a faulty electrical circuit, in the first operating mode (for example when the vehicle is operated). In the second operating mode (for example when the vehicle is parked), this main safety device is turned off (deactivated) and does not consume any current. In order to achieve the overcurrent protection function in the second operating mode, the auxiliary safety device provided with a P-type transistor is used. The overcurrent protection function is achieved by the P-type transistor coupled with a passive component that provides a drop voltage, when a current passes through the passive component, said drop voltage being used as a command to control turning off the P-type transistor.

The present configuration has the advantage of an extremely low electrical consumption (equal or very close to zero) due to the use of the passive component for providing the drop voltage and the P-type transistor, in the second operating mode. In case of an excess of current flowing through the passive component, the latter provides a high voltage drop that controls turning off the P-type transistor and therefore the current flow is interrupted. The overcurrent protection function is thus achieved on the basis of structural elements (P-type transistor and drop voltage passive component) that do not consume electrical energy. Therefore, the quiescent current of such a system is zero or very close to zero.

In the first operating mode, the main safety device is used and allows to drain high currents in case of malfunction.

A controller, such as a controller of a vehicle integrating the electrical safety system, may control turning on the first transistor of the main safety device and turning off the second transistor of the auxiliary safety device, in a first operating mode of the electrical circuit, and control turning off the first transistor of the main safety device and turning on the second transistor of the auxiliary safety device, in a second operating mode of the electrical circuit.

A second aspect of the present disclosure concerns an electrical safety device for providing overcurrent protection of an electrical circuit including a transistor of P-type for providing overcurrent protection of the electrical circuit; a passive component, connected in series with the transistor of P-type, for providing a voltage drop when a current passes through said passive component, and a driving circuit controlling turning off of the transistor of P-type under control of the voltage drop exceeding a first threshold.

The passive component for providing the voltage drop may be a resistive element.

The driving circuit may include a first switch, controlled by the voltage drop, that is turned off as long as the voltage drop does not exceed the first threshold and turned on under control of the voltage drop exceeding the first threshold so as to output a control signal for controlling turning off the transistor of P-type.

The first switch may be either a bipolar transistor or a MOSFET transistor. These types of transistor have a quiescent current that is zero.

The driving circuit may include a second switch through which the P-type transistor of overcurrent protection is connected to the ground.

The second switch can be a transistor of N-type.

The driving circuit may include a latch component for controlling the second switch with an output signal depending on a control signal received through either a reset input or a set input, and the first switch outputs a control signal to the latch component.

The driving circuit may include a third switch, controlled by the voltage drop, that is turned off as long as the voltage drop does not exceed a second threshold, said second threshold being less than the first threshold, and turned on under control of the voltage drop exceeding the second threshold and then transmit a wake-up signal.

The third switch may be either a bipolar transistor or a MOSFET.

In a particular embodiment, the first switch is a MOSFET and the third switch is a bipolar transistor. The threshold voltage of a MOSFET is usually higher that the threshold voltage of a bipolar transistor. Such a configuration allows to use the physical characteristics of these two different types of transistors (MOSFET and bipolar) to define the first "high" threshold and the second "low" threshold.

A third aspect of the present disclosure concerns a vehicle integrating the electrical safety system or the electrical safety device, as previously defined.

Other features, purposes and advantages of the disclosure will become more explicit by means of reading the detailed statement of the non-restrictive embodiments made with reference to the accompanying drawings.

DETAILED DESCRIPTION

Figure 1:
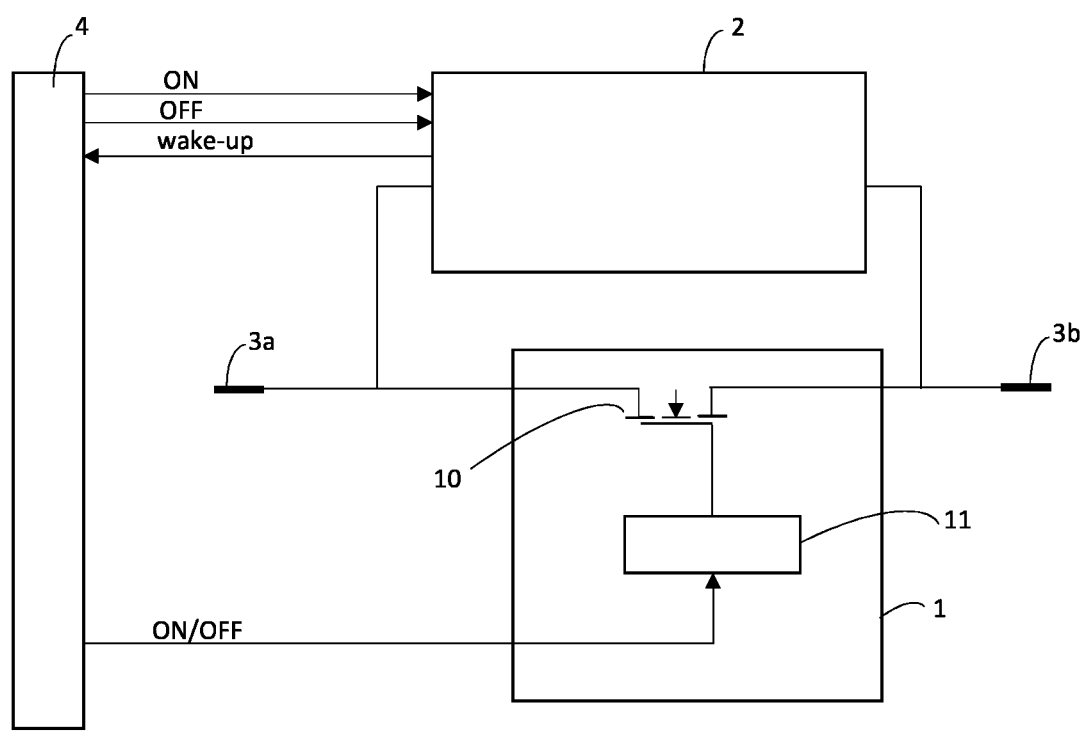
FIG. 1 shows an electrical safety system for providing overcurrent protection of an electrical circuit, according to a first embodiment.

FIG. 1 shows an electrical safety system 100 for providing overcurrent protection of an electrical circuit (not represented), according to a first embodiment. For example, the system 100 may be integrated in a vehicle, the electrical circuit having electrical and electronic devices of the vehicle, supplied with electrical current by an automotive battery of 12V for example. The electrical safety system 100 drains excess current resulting from a malfunction (such as an overload or a short circuit) in the electrical circuit. More precisely, its main function is to interrupt current flow in the electrical circuit when current reaches an overcurrent detection value.

The electrical safety system 100 has a main safety device 1 and an auxiliary safety device 2. Both safety devices 1 and 2 are connected (in parallel) to an input terminal 3a and an output terminal 3b of the electrical circuit. The main safety device 1 provides overcurrent protection of the electrical circuit in a first operating mode of the electrical circuit, while the auxiliary safety device 2 provides overcurrent protection of the electrical circuit in a second operating mode of the electrical circuit. Thus, the main safety device 1 and the auxiliary safety device 2 provide the overcurrent protection of the electrical circuit alternately, respectively in a first operating mode and in a second operating mode of the electrical circuit.

The first operating mode is expected to consume more electrical energy than the second operating mode. Typically, the first operating mode corresponds to a mode wherein the vehicle is operated, such as a drive mode, while the second operating mode corresponds to a mode wherein the vehicle is not operated (for example the vehicle is stopped and parked, the electrical circuit being in sleep mode). In the second operating mode, the electrical circuit operates but with a very low electrical consumption, in sleep mode. The main safety device 1 is intended to be used in the first operating mode, to provide the overcurrent protection function, and deactivated in the second operating mode. On the other hand, the auxiliary safety device 2 is intended to be used in the second operating mode, to provide the overcurrent protection function, and deactivated in the first operating mode. In other words, the main safety device 1 and the auxiliary safety device are operated alternately to provide the overcurrent protection function of the electrical circuit.

In the present embodiment, the main safety device 1 includes a first transistor 10, for example a N-type transistor, for providing the overcurrent protection function, connected between the input terminal 3a and the output terminal 3b of the electrical circuit. The main safety device 1 further includes a charge pump 11 for driving transistor 10 depending on a control signal "ON" (activation) or "OFF" (deactivation) from a controller 4 external to the main safety device 1. The charge pump 11 is connected to a command gate of the first transistor 10 and to a connection point 12 between input and output terminals 3a and 3b (for example between input terminal 3a and transistor 10 as shown in FIG. 1). The control signal "ON" is for turning on (or activating, or switching on) the first transistor 10 so that current can flow through transistor 10, while the control signal "OFF" is for turning off (or deactivating or switching off) the first transistor 10, so that current flow through transistor 10 is interrupted. The main safety device 1 is for example a known high-side switch of the market. It has a good capacity to safely drive high currents into grounded loads, in case of malfunction or overload in the electrical circuit of the vehicle.

The auxiliary safety device 2 is an electronic device that provides an overcurrent protection function with an extremely low electrical consumption, close to zero, by using the physical characteristics of some electrical components, as will be apparent later in the description. It has a draining capacity for removing current in case of malfunction that may be lower than the draining capacity of the main auxiliary device 1.

A first embodiment of the auxiliary safety device 2 is now described with reference to FIG. 2.

Figure 2:
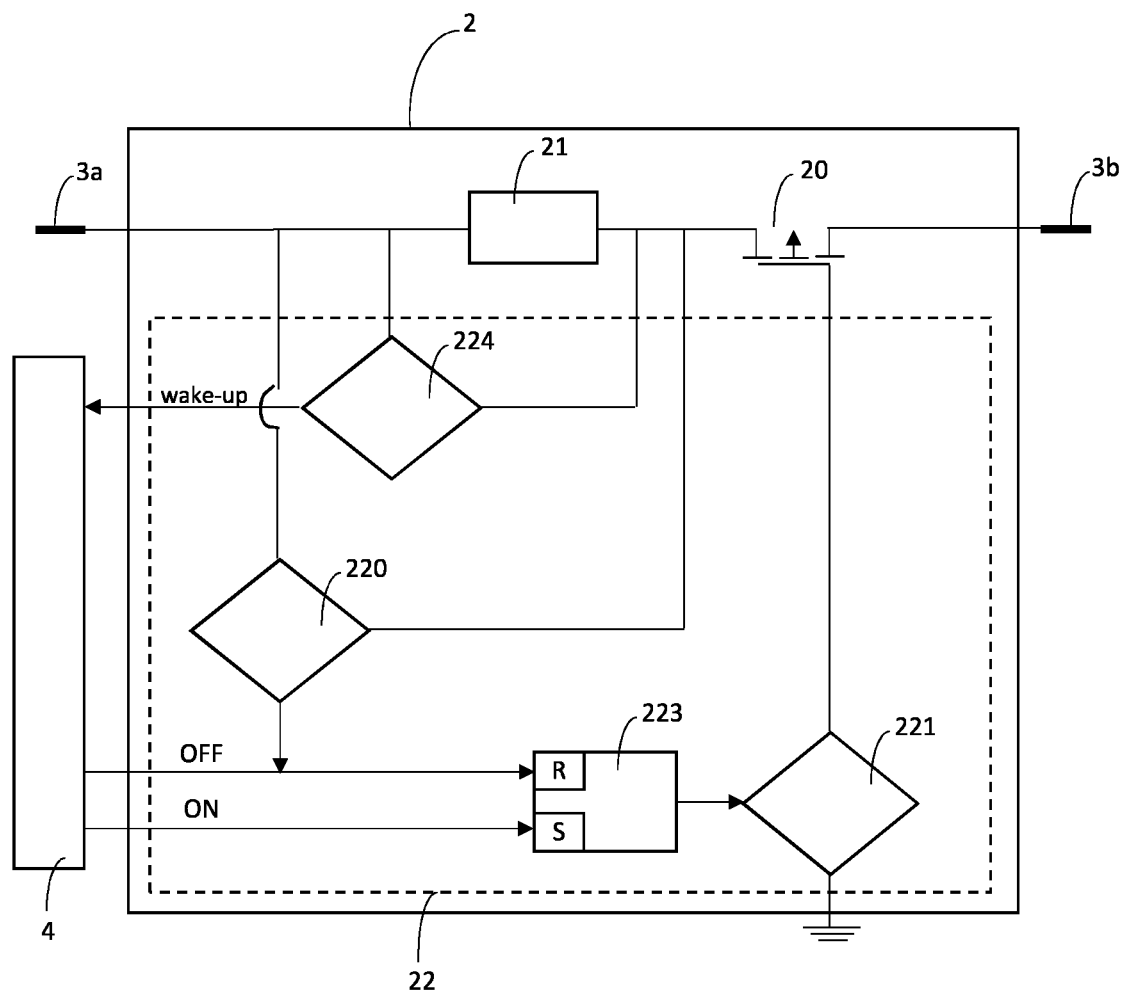
FIG. 2 shows an auxiliary electrical safety device of the system of FIG. 1.

With reference to FIG. 2, the auxiliary safety device 2 includes a second transistor of P-type 20 for providing the function of overcurrent protection of the electrical circuit of the vehicle, and a passive component 21, connected in series with the P-type transistor 20, for providing a voltage drop when current flows through said passive component 21. For example, transistor 20 of overcurrent protection is a PMOS-FET.

A driving circuit 22 is further provided to control turning off the second P-type transistor of overcurrent protection 20 under control of the voltage drop (provided by component 21) exceeding a first threshold VrHi, in the second operating mode of the electrical circuit.

In the first embodiment, the driving circuit 22 generates a wake-up (or activation) control signal under control of the voltage drop (provided by component 21) exceeding a second threshold $V_{TH2}$, in the second operating mode of the electrical circuit.

The first and second thresholds $V_{TH1}$ and $V_{TH2}$ are voltage values. The second threshold $V_{TH2}$ is less than the first threshold $V_{TH1}$.

The basic function of the driving circuit 22 is to control switching off the second transistor 20 of overcurrent protection in the second operating mode. The wake-up function of the driving circuit 22 is optional.

The driving circuit 22 has a first switch 220 controlled by the voltage drop 21 and which is turned off as long as the voltage drop provided by component 21 does not exceed the first threshold $V_{TH1}$ and is turned on under control of the voltage drop 21 exceeding the first threshold $V_{TH1}$ so as to output a control signal for controlling turning off the P-type transistor 20.

In the first embodiment, the first switch 220 is a transistor. For example, the transistor 220 is either a bipolar transistor or a MOSFET (metal-oxide-semiconductor field-effect transistor). The transistor 220 is connected to the two terminals of the voltage drop component 21, so that the voltage drop controls operation of the transistor 220. If the transistor 220 is a bipolar transistor, the base and emitter of the transistor 220 are respectively connected to the two terminals of voltage drop component 21. If the transistor 220 is a MOSFET, the grid and source of the transistor 220 are respectively connected to the two terminals of voltage drop component 21 so that the voltage drop corresponds to VGS, that is the voltage between grid and source of the transistor 220, and controls operation of the transistor 220.

The transistor 220 (first switch) operates as follows: it is blocked and operates as an open switch, as long as the voltage drop is less than the first threshold $V_{TH1}$, and it is saturated and operates as a closed switch if the voltage drop exceeds the first threshold $V_{TH1}$.

The first threshold $V_{TH1}$ corresponds to the threshold voltage of the transistor 220.

For example, the threshold voltage $V_{TH1}$ is between 1 V and 5 V, for example it is equal to 1,2 V.

The passive component 21, also called "voltage drop component", has a resistive element. For example, passive component 21 has only a resistance. The resistive value of passive component 21 is adapted to provide a voltage drop value equal to threshold voltage $V_{TH1}$, suitable to control turning on a first switch 220, when a current passing through component 21 reaches or exceeds an overcurrent detection value $I_{TH1}$. The overcurrent detection value corresponds to an current threshold beyond which it is desired to achieve the overcurrent protection function and interrupt the current flow in the electrical circuit. In other words, the resistive value R of voltage drop component 21 is determined to provide a voltage drop equal of $V_{TH1}$ when the current flowing through component 21 reaches the current threshold $I_{TH1}$ (or overcurrent detection value). More precisely, in the present embodiment, the resistive value R of drop voltage component 21 is equal to $V_{TH1}/I_{TH1}$. For example (the exemplary values only are given to illustrate the present disclosure):

if $V_{TH1}$=1,2 V and $I_{TH1}$=200 mA;

then R=$V_{TH1}/I_{TH1}$=1,2/0,2=6 Ω.

In the driving circuit 22, the switch 220 controls turning off (or switching off) the P-type transistor 20 of overcurrent protection through a second switch 221. The second switch 222 is for example transistor of N-type that controls the P-type transistor of overcurrent protection 20. It has the function of connecting a command gate of P-type transistor 20 to the ground. In other words, the command gate of P-type transistor 20 is connected to the ground through the N-type transistor 222.

The second switch 221 is controlled through an electronic latch component 223. Latch component 223 includes a set input "S", a reset input "R" and an output having two stable states that are set according to control signals received through set or reset inputs. Advantageously, latch component 223 includes only MOSFET and/or bipolar transistors to achieve the latch function while avoiding any quiescent current. The output of latch component 223 is connected to a command gate of switch 221. The latch component 223 outputs a control signal for controlling the second switch 221. The set input and the reset input of latch component 223 are connected to the external controller 4, here through two respective links. The set input receives a control signal "ON" (activation), from the external controller 4, for turning on (or switching on) the second switch 221 and consequently turning on (or switching on) the P-type transistor 20. The reset input receives a control signal "OFF" (deactivation), from the external controller 4, for turning off (or switching off) the second switch 221 and consequently turning off (or switching off) the P-type transistor 20.

The first switch 220 is also connected to the reset input of latch component 223 and transmits a control signal "OFF" (deactivation) to the reset input of latch component 223, in order to turn off second switch 221 and consequently P-type transistor 20, upon activation (or switching on), as will be explained later.

In the first embodiment, the driving circuit 22 further has a third switch 224 for generating a wake-up or activation signal when the current flow through voltage drop component 21 increases a little, due to a normal action of one or more devices of the vehicle, in the second operating mode. The function of this switch 224 is to transmit a wake-up signal to the electrical circuit, in the second operating mode, when the current flowing through the drop voltage component 21 exceeds the second threshold value $V_{TH2}$, that is less than the first threshold value $V_{TH1}$. This wake-up signal can be used to reactivate the main safety device 1, either directly or through controller 4, because it is expected that the electrical circuit will soon go into the first operating mode. The third switch 224 is controlled by the voltage drop, as first switch 220, and is: turned off as long as the voltage drop (provided by component 21) does not exceed the second threshold $V_{TH2}$, and turned on under control of the voltage drop exceeding the second threshold $V_{TH2}$ and then transmit a wake-up signal to the electrical circuit.

In the first embodiment, the third switch 224 is a transistor. For example, the transistor 224 is either a bipolar transistor or a MOSFET (metal-oxide-semiconductor field-effect transistor). The transistor 224 is connected to the two terminals of the voltage drop component 21, so that the voltage drop controls operation of the transistor 224. If the transistor 224 is a bipolar transistor, the base and emitter of the transistor 224 are respectively connected to the two terminals of voltage drop component 21. If the transistor 224 is a MOSFET, the grid and source of the transistor 224 are respectively connected to the two terminals of voltage drop component 21 so that the voltage drop corresponds to $V_{GS}$, that is the voltage between grid and source of the transistor 224, and controls operation of the transistor 224. The transistor 224 operates as follows: it is blocked and operates as an open switch, as long as the voltage drop is less than the second threshold $V_{TH2}$, and it is saturated and operates as a closed switch if the voltage drop exceeds the second threshold $V_{TH2}$.

The second threshold $V_{TH2}$ corresponds to the threshold voltage of transistor 224. Advantageously, the threshold voltage $V_{TH2}$ is between 0,6 V and 1 V. For example, the threshold voltage $V_{TH2}$ is equal to 0,7 V. In the illustrative example previously given, the resistive value R of voltage drop component 21 is equal to 6 ω. In that case, the switch 224 is turned on if the current that flows through component 21 exceeds $V_{TH2}/R = 0,7/6 \approx 116$ mA.

Since the second threshold value $V_{TH2}$ is less than the first threshold value $V_{TH1}$, the voltage drop may exceed $V_{TH2}$ without reaching or before reaching $V_{TH1}$. In such a case, the third switch 224 allows to wake up one or more devices of the electrical circuit in the vehicle, in particular the main safety device 1. When the main safety device 1 is reactivated, the calculator 4 (controller) of the vehicle controls turning off the P-type transistor 20 of overcurrent protection of the auxiliary safety device 2, by transmitting a control signal OFF to the reset or "R" input of latch component 223.

The controller 4 is provided to control the operation of the main safety device 1 and the auxiliary safety device 2. More precisely, the controller 4 controls: turning on the N-type transistor of overcurrent protection 10 of the main safety device 1 and turning off the P-type transistor of overcurrent protection 20 of the auxiliary safety device 2, in the first operating mode of the electrical circuit; turning off the N-type transistor of overcurrent protection 10 of the main safety device 1 and turning on the P-type transistor of overcurrent protection 20 of the auxiliary safety device 2, in the second operating mode of the electrical circuit, the first operating mode consuming more electrical power than the second operating mode.

The controller 4 is, for example, a calculator of the vehicle.

The operation of the safety system 100 will now be described.

When the vehicle is operated for example in drive mode, its electrical circuit is in the first operating mode. In this first operating mode, the main safety device 1 is operated to provide the overcurrent protection function of the electrical circuit, in a conventional manner. The N-type transistor 10 of overcurrent protection is turned on, under command of the controller 4, and operates as a closed switch, so that current can flow through the transistor 10 and input and output terminals 3a, 3b of the electrical circuit of the vehicle. The input and output terminals 3a, 3b are connected to one another through the N-type transistor 10 (closed switch).

In this first operating mode, the auxiliary safety device 1 is deactivated. It means that the P-type transistor of overcurrent protection 20 is turned off and operates as an open switch. Consequently, no current flows through the voltage drop component 21. The drop voltage is zero and therefore the first and third switches 220, 224 are also turned off and operate as open switches. Deactivation of the auxiliary safety device 1 is usually triggered by an impulse signal "OFF" transmitted from the controller 4 to the set input of latch component 223. As a result, the output signal from latch component 223 controls the second switch 221 to be turned off and to operate as an open switch. In this state, the transistor 20 is not connected to the ground and therefore is turned off.

Then, we assume that the vehicle is stopped and parked. Therefore, its electrical circuit goes into the second operating mode (or "park mode" or "sleep mode"). In this second operating mode, the electronic devices of the vehicle go into sleep mode and their electrical consumption is zero or close to zero. To enter the second operating mode, the controller 4 transmits a control signal OFF for deactivating the main safety device 1 and, at the same time, a control signal ON to the auxiliary safety device 2 to activate the auxiliary safety device 2.

Upon reception of the control signal OFF from controller 4 by the main safety device 1, the charge pump 21 is stopped and consequently N-type transistor 10 of overcurrent protection is turned off and operates as an open switch.

In the auxiliary safety device 20, the control signal ON from controller 4 is received by the set input of latch component 223. Consequently, the output signal from latch component 223 is changed and therefore controls turning on the second switch 221. Thus, the second switch 221 operates as a closed switch under control of the output signal from latch component 223. As a result, the command gate of the P-type transistor 20 is connected to the ground through the second switch 221 which results in turning on the P-type transistor 20 that operates as a closed switch. The input and output terminals 3a, 3b of the electrical circuit are thus connected to one another through the voltage drop component 21 and the P-type transistor 20.

In the second operating mode, the current through the voltage drop component 21 is usually equal or close to zero, since most of the electronic devices of the electrical circuit are in sleep or standby mode. As a result, the voltage drop provided by component 21 is equal or close to zero. So, the first and third switches are turned off and operate as open switches.

In the second operating mode, according to a first scenario, the current flowing through voltage drop component 21 increases a little, due to a normal action achieved by one or more electronic devices of the vehicle. Such a small increase of current results in a small increase of the voltage drop provided by component 21. Such a scenario may occur for example when a user with a contactless key comes close to the vehicle. The contactless key wakes up some devices within the vehicle, which results in an increase of the current in the electrical circuit. If the resulting voltage drop exceeds the second threshold voltage $V_{TH2}$, it has the effect of turning on the third switch 224. The third switch 224 switches on, under control of the voltage drop exceeding $V_{TH2}$, and therefore transmits a wake-up signal to electrical circuit. For example, the wake-up signal from the third switch 225 is used to activate or wake up the controller 4 and then the controller 4 can activate the main safety device 1 by transmitting a signal ON to the charge pump 21 and deactivate the auxiliary safety device 2 by transmitting a signal OFF to the latch component 223. As previously indicated, the wake-up function provided by the third switch 224 is optional.

As long as the voltage drop remains below the first threshold value $V_{TH1}$, the first switch 220 is maintained turned off and continues to operate as an open switch.

In the second operating mode, according to a second scenario, the current flowing through voltage drop component 21 increases too much, which results in an important increase of the voltage drop, due for example to a malfunction (overload, short circuit, etc.) in the electrical circuit. In such a case, the voltage drop exceeds not only the first threshold voltage $V_{TH1}$ but also the second threshold voltage $V_{TH2}$, usually in a very short period of time. The first switch 220 is turned on under control of the voltage drop exceeding the first threshold $V_{TH1}$. As a result, the first switch 220 outputs a control signal that is transmitted to the reset input of latch component 223, which, in turn, controls turning off the second switch 221 under control of the output signal from latch component 223 (which state is changed). Upon switching off the second switch 221, the P-type transistor 20 of overcurrent protection is no longer connected to the ground and is consequently turned off. As the transistor 20 is turned off, the current flow through the transistor 20 is interrupted. The overcurrent protection is thus achieved.

In the above second scenario of the voltage drop exceeding the first threshold $V_{TH1}$, the voltage drop also exceeds the second threshold $V_{TH2}$ and, consequently, the third switch 224 is turned on and transmits a wake-up signal to the electrical circuit.

In a particular embodiment, the first switch 220 is a MOSFET and the third switch 224 is a bipolar transistor. Such a structure is advantageous because the threshold voltage of a bipolar transistor is usually less than the threshold voltage of a MOSFET transistor. Thus, it allows to provide a "high" voltage threshold $V_{TH1}$, for the overcurrent protection function, and a "low" voltage threshold $V_{TH2}$, by simply using the physical characteristics of these two different types of transistor.

In the first embodiment, the resistive value of drop voltage component 21 is determined according to a fixed overcurrent detection value (for example 200 mA) and the threshold voltage of transistor 220 of the first switch (for example 1,2V).

In a variant, the threshold voltage $V_{TH2}$ is not equal to the threshold voltage of the transistor 224 but depends on the threshold voltage of the transistor 224 coupled with a resistive element.

In another variant, the threshold voltage $V_{TH1}$ is not equal to the threshold voltage of the transistor 220 but depends on the threshold voltage of the transistor 220 coupled with a resistive element.

Such configurations allow to adjust the threshold voltage values $V_{TH1}$ and/or $V_{TH2}$.

A second embodiment of the electrical safety system is analogous to the first embodiment and only differs in that the auxiliary safety device a does not include a third switch 224.

The preceding description is illustrative rather than limiting in nature. Variations and modifications of the disclosed example embodiments may become apparent to those skilled in the art that do not necessarily depart from the essence of the invention. The scope of legal protection provided to the invention can only be determined from the following claims.

We claim:

1. An electrical safety system for providing overcurrent protection of an electrical circuit, the electrical safety system comprising:
   a main safety device including a first switch for selectively providing a first level of overcurrent protection of the electrical circuit during a first operating mode in which the electrical circuit includes a first amount of electrical energy consumption;
   an auxiliary safety device including
      a second switch for selectively providing a second level of overcurrent protection of the electrical circuit during a second operating mode in which the electrical circuit includes a second amount of electrical energy consumption, and
      a voltage drop component in electrical series with the second switch for providing a voltage drop when current passes through the voltage drop component during the second operating mode,
      wherein the second level of overcurrent protection is lower than the first level of overcurrent protection and the second amount of electrical energy consumption is lower than the first amount of electrical energy consumption; and
   a driving circuit for controlling the second switch to protect the electrical circuit from overcurrent when the voltage drop exceeds a predetermined threshold.

2. The system according to claim 1, wherein
   the electrical circuit is installed on a vehicle including electronic devices,
   the first operating mode corresponds to the electronic devices being turned on, and
   the second operating mode corresponds to the electronic devices of the vehicle being turned off or in a sleep mode.

3. The system according to claim 2, comprising a controller that is configured to
   activate the main safety device and deactivate the auxiliary safety device when the electronic devices are turned on, and
   activate the auxiliary safety device and deactivate the main safety device when the electronic devices are turned off or in the sleep mode.

4. The system according to claim 1, wherein the voltage drop component comprises a passive, resistive element.

5. The system according to claim 1, wherein
   the first switch is either a bipolar transistor or a MOSFET transistor, and
   the second switch comprises a P-type transistor switch.

6. The system according to claim 5, wherein the driving circuit selectively connects the P-type transistor switch to ground when the voltage drop exceeds the predetermined threshold.

7. The system according to claim 6, wherein
   the driving circuit comprises a second switch that is a transistor of N-type, and
   the second switch selectively connects the P-type transistor switch to ground.

8. The system according to claim 4, wherein the driving circuit comprises a latch component for controlling the second switch with an output signal depending on a control signal received through either a reset input or a set input of the latch component.

9. The system according to claim 7, wherein
   the driving circuit includes a third switch, controlled by the voltage drop;

the third switch is turned off as long as the voltage drop does not exceed a second threshold that is less than the predetermined threshold;

the third switch is turned on under control of the voltage drop exceeding the second threshold; and the driving circuit transmits a wake-up signal when the third switch is turned on.

10. The system according to claim 9, wherein the third switch is either a bipolar transistor or a MOSFET transistor.

11. The system according to claim 9, wherein the first switch comprises a MOSFET transistor and the third switch is a bipolar transistor.

12. The system according to claim 1, wherein the first switch comprises an N-type transistor.

13. A vehicle comprising the electrical safety system according to claim 1.

14. A method of providing overcurrent protection for an electrical circuit, the method comprising:

providing a first level of overcurrent protection for the electrical circuit through a main safety device during a first operating mode in which the electrical circuit includes a first amount of electrical energy consumption; and providing a second level of overcurrent protection for the electrical circuit through an auxiliary safety device during a second operating mode in which the electrical circuit includes a second amount of electrical energy consumption, by controlling the auxiliary device based on a voltage drop exceeding a predetermined threshold, wherein the second level of overcurrent protection is lower than the first level of overcurrent protection and the second amount of electrical energy consumption is lower than the first amount of electrical energy consumption.

15. The method according to claim 14, wherein the electrical circuit is installed on a vehicle including electronic devices, the first operating mode corresponds to the electronic devices being turned on, and the second operating mode corresponds to the electronic devices of the vehicle being turned off or in a sleep mode.

16. The method according to claim 15, comprising:

activating the main safety device and deactivating the auxiliary safety device when the electronic devices are turned on, and activating the auxiliary safety device and deactivating the main safety device when the electronic devices are turned off or in the sleep mode.

* * * * *